United States Patent
Arai

(10) Patent No.: US 10,614,720 B2
(45) Date of Patent: Apr. 7, 2020

(54) INFORMATION PRESENTATION METHOD AND INFORMATION PRESENTATION DEVICE

(71) Applicants: Panasonic Corporation, Osaka (JP); The Board of Trustees of the Leland Stanford Junior University, Stanford, CA (US)

(72) Inventor: Toshiya Arai, Osaka (JP)

(73) Assignees: PANASONIC CORPORATION, Osaka (JP); THE BOARD OF TRUSTEES OF THE LELAND STANFORD JUNIOR UNIVERSITY, Stanford, CA (US)

( * ) Notice: Subject to any disclaimer, the term of this patent is extended or adjusted under 35 U.S.C. 154(b) by 73 days.

(21) Appl. No.: 15/938,626

(22) Filed: Mar. 28, 2018

(65) Prior Publication Data

US 2018/0218612 A1    Aug. 2, 2018

Related U.S. Application Data

(63) Continuation of application No. PCT/JP2016/004638, filed on Oct. 20, 2016.
(Continued)

(51) Int. Cl.
*G08G 1/16* (2006.01)
*G08G 1/0967* (2006.01)
(Continued)

(52) U.S. Cl.
CPC ......... *G08G 1/167* (2013.01); *G06K 9/00791* (2013.01); *G08G 1/012* (2013.01);
(Continued)

(58) Field of Classification Search
USPC ........................................................ 340/901
See application file for complete search history.

(56) References Cited

U.S. PATENT DOCUMENTS

| 2,485,719 A * | 10/1949 | Edwards ....................... 304/458 |
| 2008/0091352 A1* | 4/2008 | O'Hare .................. G08G 1/163 701/301 |

(Continued)

FOREIGN PATENT DOCUMENTS

| JP | 2004-164315 | 6/2004 |
| JP | 2006-79167 | 3/2006 |

(Continued)

OTHER PUBLICATIONS

International Search Report (ISR) dated Jan. 10, 2017 in International (PCT) Application No. PCT/JP2016/004638.
(Continued)

*Primary Examiner* — Brent Swarthout
(74) *Attorney, Agent, or Firm* — Wenderoth, Lind & Ponack, L.L.P.

(57) ABSTRACT

Provided is an information presentation method capable of, when a vehicle tries to enter a second lane different from a first lane on which the vehicle is traveling, effectively presenting information for assisting situation determination by a driver. The information presentation method for presenting information for assisting situation determination by a driver of a vehicle includes: acquiring information about an object located in a periphery of the vehicle; determining whether or not the vehicle can enter a second lane different from a first lane on which the vehicle is traveling, based on the information about the object; and presenting a result of the determination to the driver.

14 Claims, 13 Drawing Sheets

Related U.S. Application Data

(60) Provisional application No. 62/301,790, filed on Mar. 1, 2016.

(51) Int. Cl.
    *G08G 1/01*       (2006.01)
    *G06K 9/00*      (2006.01)
    *G08G 1/0962*    (2006.01)

(52) U.S. Cl.
    CPC ......... *G08G 1/0112* (2013.01); *G08G 1/0129* (2013.01); *G08G 1/0962* (2013.01); *G08G 1/096716* (2013.01); *G08G 1/096741* (2013.01); *G08G 1/096775* (2013.01); *G08G 1/166* (2013.01); *G06K 9/00805* (2013.01); *G06K 9/00825* (2013.01)

(56) References Cited

U.S. PATENT DOCUMENTS

| | | |
|---|---|---|
| 2008/0119994 A1 | 5/2008 | Kameyama |
| 2009/0088925 A1 | 4/2009 | Sugawara et al. |
| 2011/0130936 A1 | 6/2011 | Noda |
| 2012/0078500 A1 | 3/2012 | Yamada et al. |
| 2012/0259539 A1* | 10/2012 | Sumizawa .......... G01C 21/3658 701/400 |
| 2014/0074356 A1 | 3/2014 | Bone et al. |
| 2017/0174261 A1* | 6/2017 | Micks .................. B60W 30/00 |
| 2019/0056230 A1* | 2/2019 | Hatav .................. G08G 1/164 |
| 2019/0139412 A1* | 5/2019 | Huang ................. G08G 1/166 |

FOREIGN PATENT DOCUMENTS

| | | |
|---|---|---|
| JP | 2006-113918 | 4/2006 |
| JP | 2007-145225 | 6/2007 |
| JP | 2008-120288 | 5/2008 |
| JP | 2008-126818 | 6/2008 |
| JP | 4525925 | 8/2010 |
| JP | 4572889 | 11/2010 |
| JP | 2013-114603 | 6/2013 |
| JP | 2015-161966 | 9/2015 |
| JP | 5781904 | 9/2015 |
| WO | 2007/123176 | 11/2007 |
| WO | 2012/160591 | 11/2012 |

OTHER PUBLICATIONS

Extended European Search Report dated Feb. 18, 2019 in corresponding European Patent Application No. 16892413.2.

\* cited by examiner

FIG. 13
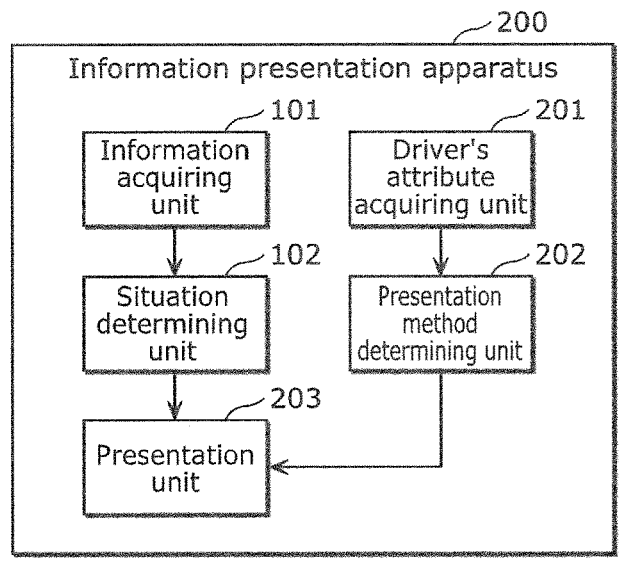
FIG. 14
| Attribute set | | Presentation method | | |
|---|---|---|---|---|
| Age | Sex | Entry possible/impossible | Safety | Speed |
| 20 - 29 | Male | 0 | 1 | 0 |
| | Female | 1 | 0 | 0 |
| 30 - 39 | Male | 1 | 1 | 0 |
| | Female | 1 | 1 | 1 |
| ⋮ | ⋮ | ⋮ | ⋮ | ⋮ |
FIG. 15
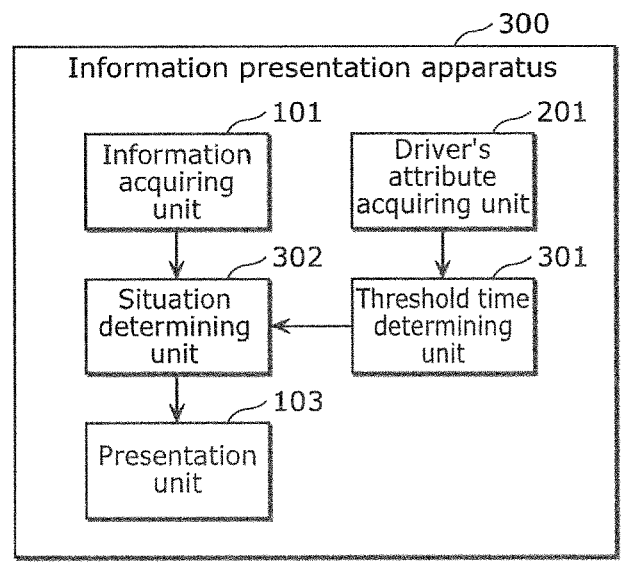

INFORMATION PRESENTATION METHOD AND INFORMATION PRESENTATION DEVICE

CROSS REFERENCE TO RELATED APPLICATIONS

This is a continuation application of PCT International Application No. PCT/JP2016/004638 filed on Oct. 20, 2016, designating the United States of America, which is based on and claims priority of U.S. Provisional Patent Application No. 62/301,790 filed on Mar. 1, 2016. The entire disclosures of the above-identified applications, including the specifications, drawings and claims are incorporated herein by reference in their entirety.

FIELD

One or more exemplary embodiments disclosed herein relate generally to an information presentation method and an information presentation device for presenting information for assisting situation determination by a driver of a vehicle to the driver.

BACKGROUND

When a driver is driving a vehicle, the driver may be required to make a difficult determination such as a determination of entry into an intersection. Development of a technique for automating such a determination and a driving operation based on a result of the determination has been promoted. It is, however, difficult to respond to an irregular situation by an automated determination, and a driver's determination is often required in the end. Further, a driver may feel dissatisfied or uneasy about a result of an automated determination.

Therefore, a technique for, when a driver himself makes a situation determination, assisting the situation determination by the driver is desired. Patent Literature (PTL) 1 (Japanese Unexamined Patent Application Publication No. 2006-79167) proposes a technique of issuing a warning when current vehicle information deviates from a predetermined determination criterion, for driving characteristic data stored in a memory.

SUMMARY

Technical Problem

In the technique of PTL 1, however, it is only presented that current driving is different from an ordinary driving pattern, and it is difficult to respond to an irregular situation. Further, in the technique of PTL 1, though it is possible to stop progress of a vehicle by a warning, it is difficult to prompt smooth progress of a vehicle.

Therefore, one non-limiting and exemplary embodiment provides an information presentation method and an information presentation device capable of, when a vehicle tries to enter a second lane different from a first lane on which the vehicle is traveling, effectively presenting information for assisting situation determination by a driver.

Solution to Problem

In one general aspect, the techniques disclosed here feature an information presentation method for presenting information for assisting situation determination by a driver of a vehicle, the method including: acquiring information about an object located in a periphery of the vehicle; determining whether or not the vehicle can enter a second lane different from a first lane on which the vehicle is traveling, based on the information about the object; and presenting a result of the determination to the driver.

General and specific aspect(s) disclosed above may be implemented using a system, a method, an integrated circuit, a computer program, or a computer-readable recording medium such as a CD-ROM, or any combination of systems, methods, integrated circuits, computer programs, or computer-readable recording media.

Additional benefits and advantages of the disclosed embodiments will be apparent from the Specification and Drawings. The benefits and/or advantages may be individually obtained by the various embodiments and features of the Specification and Drawings, which need not all be provided in order to obtain one or more of such benefits and/or advantages.

Advantageous Effects

Therefore, an information presentation method according to one or more exemplary embodiments or features disclosed herein is capable of, when a vehicle tries to enter a second lane different from a first lane on which the vehicle is traveling, effectively presenting information for assisting situation determination by a driver.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 13 is a block diagram illustrating a functional configuration of an information presentation device according to Embodiment 2.

FIG. 14 is a diagram illustrating an example of information showing correspondence relationships between attribute sets and presentation methods in Embodiment 2.

FIG. 15 is a block diagram illustrating a functional configuration of an information presentation device according to Embodiment 3.

DESCRIPTION OF EMBODIMENTS

Certain embodiments will be specifically described below with reference to drawings.

All of the embodiments described below show comprehensive or specific examples. Numerical values, shapes, materials, components, arrangement positions and connection forms of the components, steps, order of steps and the like shown in the embodiments below are mere examples and are not intended to limit the claims. Further, as for components which are not described in independent claims showing top concepts, among the components in the embodiments below, the components will be described as arbitrary components.

Embodiment 1

First, Embodiment 1 will be specifically described with reference to FIGS. 1 to 12D.

[Configuration of Vehicle]

Figure 1:
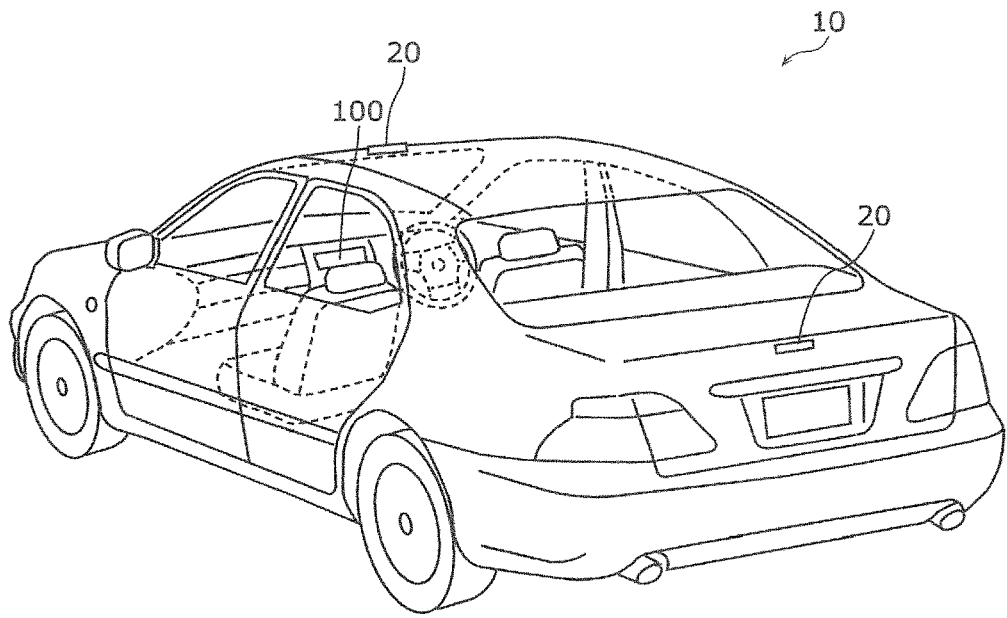
FIG. 1 is a perspective view of a vehicle according to Embodiment 1.

FIG. 1 is a perspective view of a vehicle 10 according to Embodiment 1. Here, the vehicle 10 is a car and is provided with a sensor 20 and an information presentation device 100.

The sensor 20 detects objects in a periphery of the vehicle 10. The sensor 20 is, for example, an LIDAR (Light Detection and Ranging, Laser Imaging Detection and Ranging), an image sensor (a camera) and a GPS (Global Positioning System) sensor.

The information presentation device 100 presents information for assisting situation determination by a driver of the vehicle 10. Here, the situation determination is determination for entry of the vehicle 10 into a second lane.

The second lane is a lane different from a first lane on which the vehicle 10 is traveling. For example, the second lane is a lane crossing the first lane or a lane adjacent to the first lane in parallel. Entry into the second lane crossing the first lane includes the vehicle 10 entering the second lane by turning an intersection right or left and the vehicle 10 traveling across the second lane by traveling straight through the intersection. Further, entry into the second lane in parallel with the first lane includes entry into a merge point between the first lane and the second lane, and lane change from the first lane to the second lane.

[Configuration of Information Presentation Device]

Figure 2:
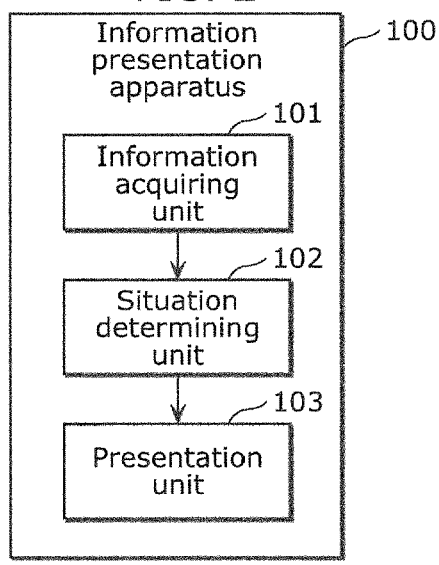
FIG. 2 is a block diagram illustrating a functional configuration of an information presentation device according to Embodiment 1.

Next, a functional configuration of the information presentation device will be specifically described below with reference to FIG. 2. FIG. 2 is a block diagram illustrating a functional configuration of the information presentation device 100 according to Embodiment 1. The information presentation device 100 is provided with an information acquiring unit 101, a situation determining unit 102, and a presentation unit 103.

The information acquiring unit 101 acquires information about objects located in the periphery of the vehicle 10. For example, the information acquiring unit 101 acquires the information about the objects by receiving signals from the sensor 20. Here, the objects include moving bodies such as other vehicles and pedestrians, and stationary objects such as a road closed sign (hereinafter referred to as obstacles).

Further, the information acquiring unit 101 may acquire the information about the objects by receiving detection results by sensors attached to objects different from the vehicle 10 (for example, traffic lights, other vehicles and pedestrians). For example, the information acquiring unit 101 may receive the object detection results by sensors attached to traffic lights via a communication network. Further, for example, the information acquiring unit 101 may receive movement information and position information about other vehicles or pedestrians detected by sensors attached to the other vehicles or sensors of information terminals carried by the pedestrians.

The situation determining unit 102 determines whether or not the vehicle 10 can enter the second lane different from the first lane on which the vehicle 10 is traveling, based on the information about the objects acquired by the information acquiring unit 101. That is, the situation determining unit 102 evaluates safety at the time of the vehicle 10 entering the second lane and determines whether the vehicle 10 can enter the second lane or not.

The presentation unit 103 presents a result of the determination by the situation determining unit 102 to the driver. The determination result selectively shows whether entry is possible or impossible. For example, if it is determined that entry is possible, the presentation unit 103 displays information showing that entry is possible on a display (not shown). On the other hand, if it is determined that entry is impossible, the presentation unit 103 displays information showing that entry is impossible on the display. The presentation unit 103 may output a voice from a speaker instead of displaying the information on the display.

[Process of Information Presentation Device]

Figure 3:
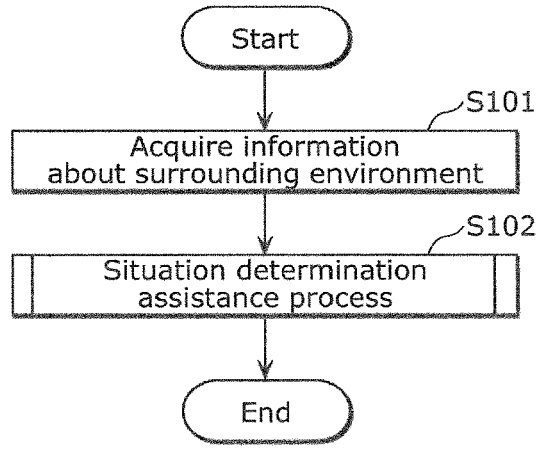
FIG. 3 is a flowchart illustrating a process of the information presentation device according to Embodiment 1.

Next, various operations of the information presentation device configured as above will be specifically described with reference to FIGS. 3 to 9. FIG. 3 is a flowchart illustrating a process of the information presentation device 100 according to Embodiment 1.

First, the information acquiring unit 101 acquires information about an environment around the vehicle 10 (S101). Specifically, the information acquiring unit 101 acquires positions and speeds of objects on the same lane as the vehicle 10 (the first lane), positions and speeds of objects on a lane different from the lane of the vehicle 10 (the second lane), and the like.

Then, the situation determining unit 102 and the presentation unit 103 execute a situation determination assistance process (S102) and end the process.

[Situation Determination Assistance Process]

Figure 4:
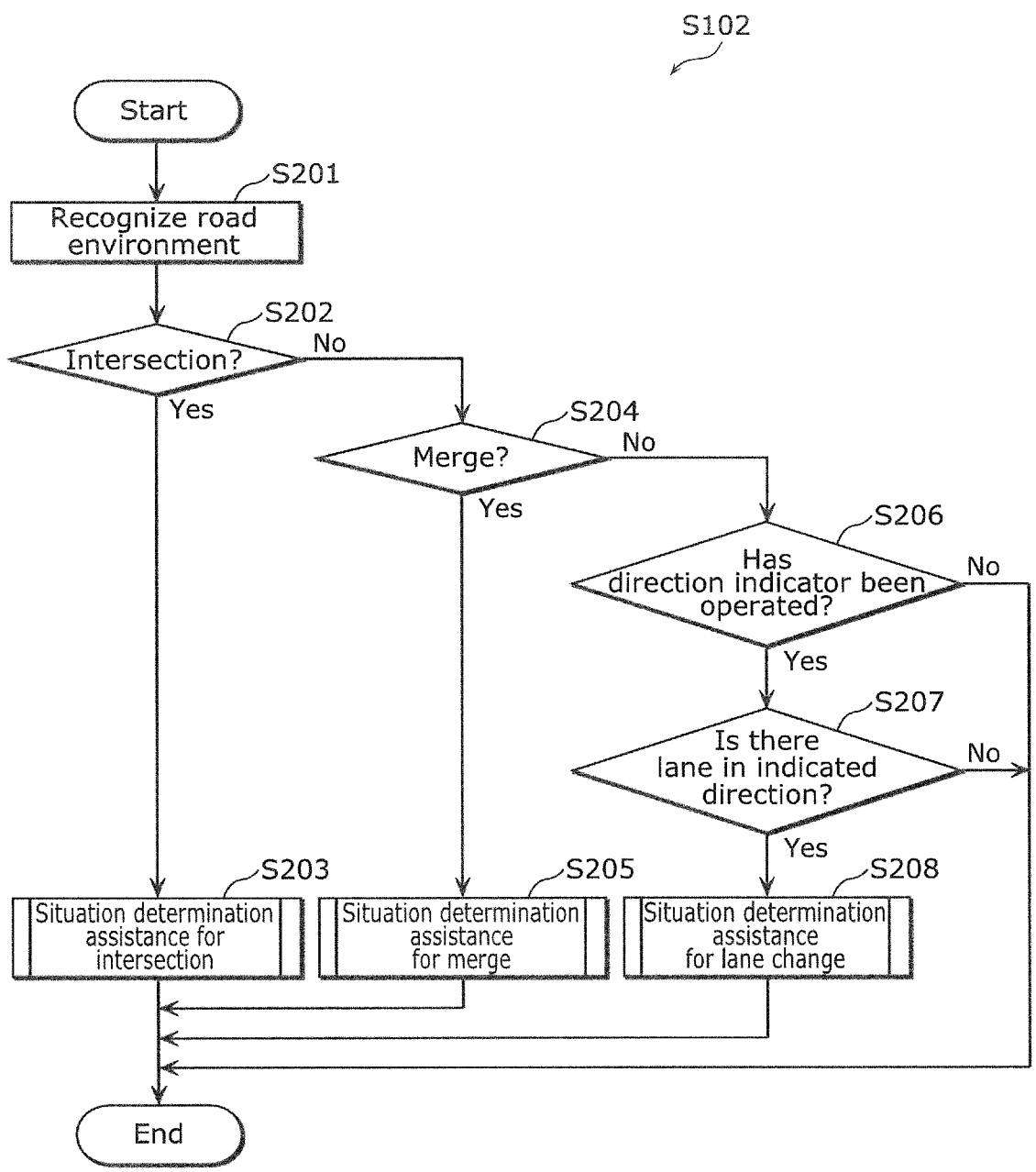
FIG. 4 is a flowchart illustrating details of a situation determination assistance process in Embodiment 1.

Here, details of the situation determination assistance process at step S102 in FIG. 3 will be specifically described with reference to FIG. 4. FIG. 4 is a flowchart illustrating details of the situation determination assistance process in Embodiment 1.

First, the situation determining unit 102 recognizes a road environment (S201). Specifically, the situation determining unit 102 recognizes a road environment which is an entry destination of the vehicle 10, for example, from an image photographed by the sensor 20 or current position information.

The situation determining unit 102 determines whether the road environment is an intersection or not (S202). If the road environment is an intersection (S202: Yes), the situation determining unit 102 and the presentation unit 103 perform situation determination assistance for intersection (S203) and end the process.

If the road environment is not an intersection (S202: No), the situation determining unit 102 determines whether the road environment is a merge or not (S204). If the road environment is a merge (S204: Yes), the situation determining unit 102 and the presentation unit 103 perform situation determination assistance for merge (S205) and end the process.

If the road environment is not a merge (S204: No), the situation determining unit 102 determines whether a direction indicator has been operated or not (S206). If the direction indicator has been operated (S206: Yes), the situation determining unit 102 determines whether there is a lane in the indicated direction or not (S207). If there is a lane in the indicated direction (Yes in S207), the situation determining unit 102 and the presentation unit 103 perform situation determination assistance for lane change (S208) and end the process.

If the direction indicator has not been operated (S206: No) or if there is not a lane in the indicated direction (S207: No), the process is immediately ended.

[Situation Determination Assistance Process for Intersection]

Figure 5:
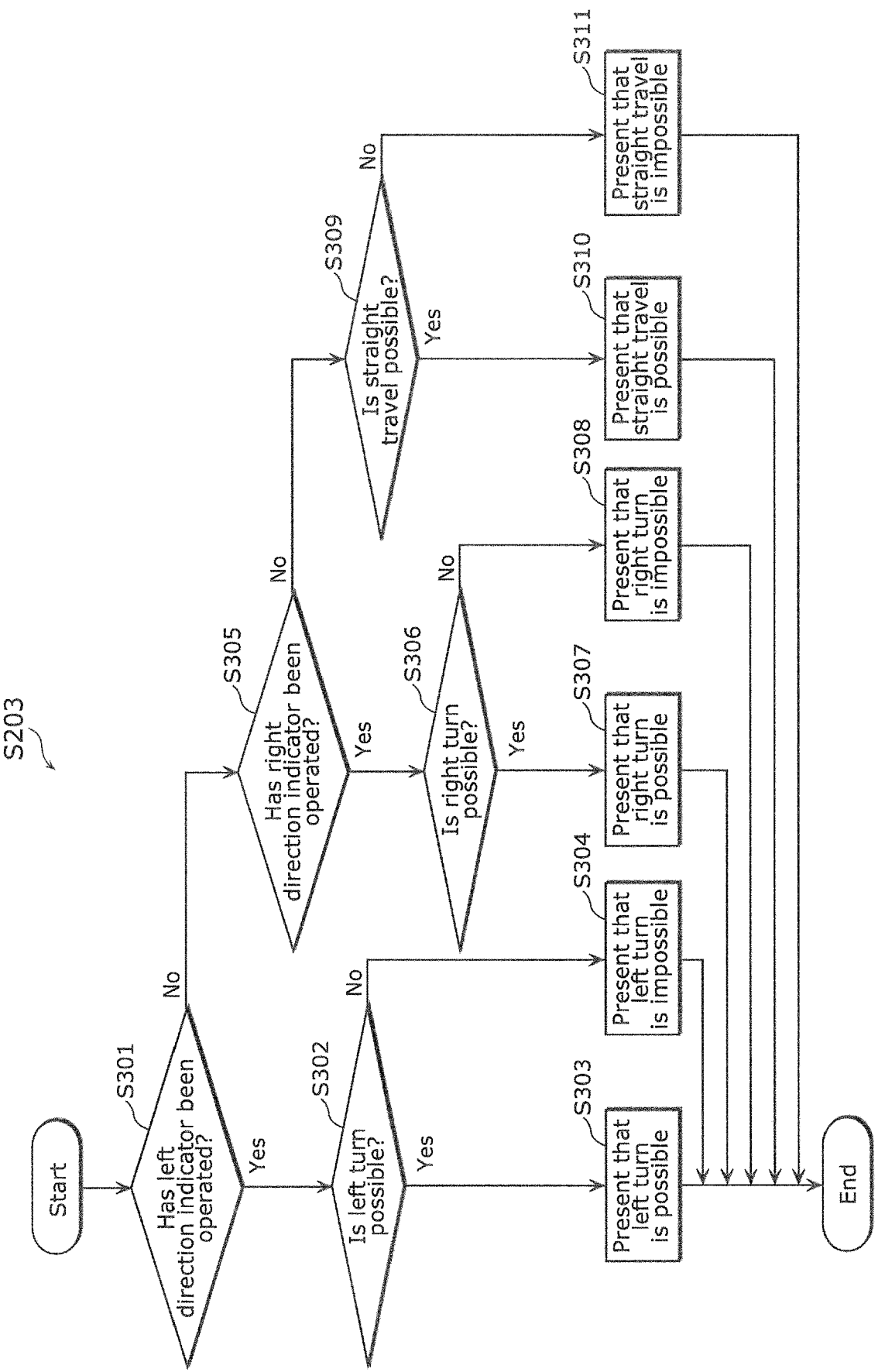
FIG. 5 is a flowchart illustrating details of a situation determination assistance process for an intersection in Embodiment 1.

Here, details of the situation determination assistance process for intersection at step S203 in FIG. 4 will be specifically described with reference to FIG. 5. FIG. 5 is a flowchart illustrating details of the situation determination assistance process for intersection in Embodiment 1.

First, the situation determining unit 102 determines whether a left direction indicator has been operated or not (S301). If the left direction indicator has been operated (S301: Yes), the situation determining unit 102 determines whether the vehicle 10 can turn the intersection left or not (S302). If it is determined that left turn is possible (S302: Yes), the presentation unit 103 presents to the driver that left turn is possible (S303) and ends the process. If it is determined that left turn is impossible (S302: No), the presentation unit 103 presents to the driver that left turn is impossible (S304) and ends the process.

If the left direction indicator has not been operated (S301: No), the situation determining unit 102 determines whether a right direction indicator has been operated or not (S305). If the right direction indicator has been operated (S305: Yes), the situation determining unit 102 determines whether the vehicle 10 can turn the intersection right or not (S306). If it is determined that right turn is possible (S306: Yes), the presentation unit 103 presents to the driver that right turn is possible (S307) and ends the process. If it is determined that right turn is impossible (S306: No), the presentation unit 103 presents to the driver that right turn is impossible (S308) and ends the process.

If the right direction indicator has not been operated (S305: No), the situation determining unit 102 determines whether or not the vehicle can travel straight through the intersection (S309). If it is determined that straight travel is possible (S309: Yes), the presentation unit 103 presents to the driver that straight travel is possible (S310) and ends the process. If it is determined that straight travel is impossible (S309: No), the presentation unit 103 presents to the driver that straight travel is impossible (S311) and ends the process.

[Determination as to Whether or Not a Left Turn is Possible]

Figure 6:
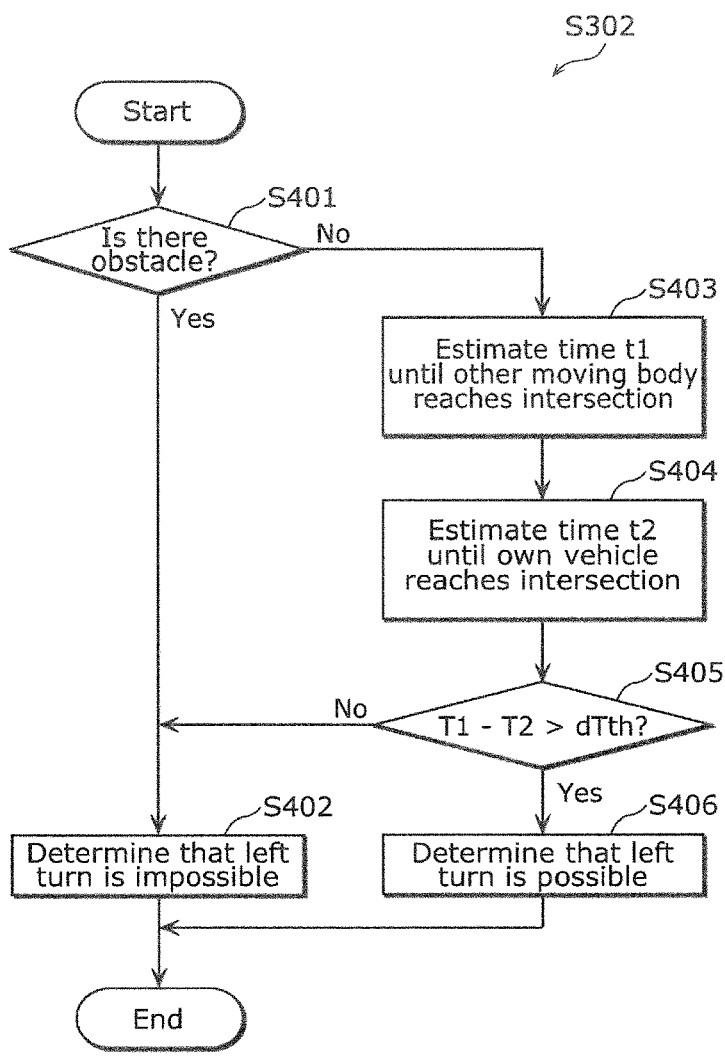
FIG. 6 is a flowchart illustrating details of determination as to whether or not a left turn is possible in Embodiment 1.

Here, details of the determination as to whether or not a left turn is possible at step S302 in FIG. 5 will be specifically described with reference to FIG. 6. FIG. 6 is a flowchart illustrating details of the determination as to whether or not a left turn is possible in Embodiment 1.

The situation determining unit 102 determines whether or not there is an obstacle on a left-turn route (S401). If there is an obstacle (S401: Yes), the situation determining unit 102 determines that left turn is impossible (S402). If there is not an obstacle (S401: No), the situation determining unit 102 estimates time T1 until another moving body reaches the intersection (S403). Furthermore, the situation determining unit 102 estimates time T2 until its own vehicle (the vehicle 10) reaches the intersection (S404).

Here, the situation determining unit 102 determines whether difference time dT12 between T1 and T2 is larger than threshold time dTth or not (S405). The difference time dT12 corresponds to time from when the vehicle 10 reaches a position on the second lane to when another vehicle reaches the position on the second lane. The threshold time dTth is, for example, time determined in advance in order to avoid contact between the vehicle 10 and a moving body.

Here, if the difference time dT12 is larger than the threshold time dTth (S405: Yes), the situation determining unit 102 determines that left turn is possible (S406) and ends the process. On the other hand, if the difference time dT12 is equal to or smaller than the threshold time dTth (S405: No), the situation determining unit 102 determines that left turn is impossible (S402) and ends the process.

Since the determination as to whether or not a right turn is possible (S306 in FIG. 5) and the determination as to whether or not straight travel is possible (S309 in FIG. 5) are similar to the determination as to whether or not a left turn is possible in FIG. 6, detailed description of the determinations is omitted, and the determinations are not shown in drawings.

[Situation Determination Assistance Process for Merging]

Figure 7:
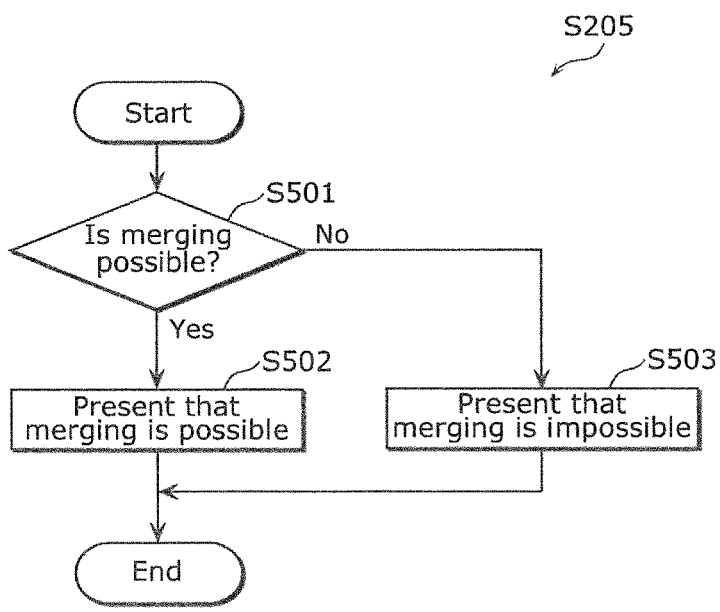
FIG. 7 is a flowchart illustrating details of a situation determination assistance process for merging in Embodiment 1.

Next, details of the situation determination assistance process for merging at step S205 in FIG. 4 will be specifically described with reference to FIG. 7. FIG. 7 is a flowchart illustrating details of the situation determination assistance process for merging in Embodiment 1.

The situation determining unit 102 determines whether the vehicle 10 can enter a merge point or not (S501). If it is determined that merging is possible (S501: Yes), the presentation unit 103 presents to the driver that merging is possible (S502) and ends the process. If it is determined that merging is impossible (S501: No), the presentation unit 103 presents to the driver that merging is impossible (S503) and ends the process.

Since the determination as to whether or not merging is possible is similar to the determination as to whether or not a left turn is possible, detailed description of the determination is omitted, and the determination is not shown in a drawing.

[Situation Determination Assistance Process for Lane Change]

Figure 8:
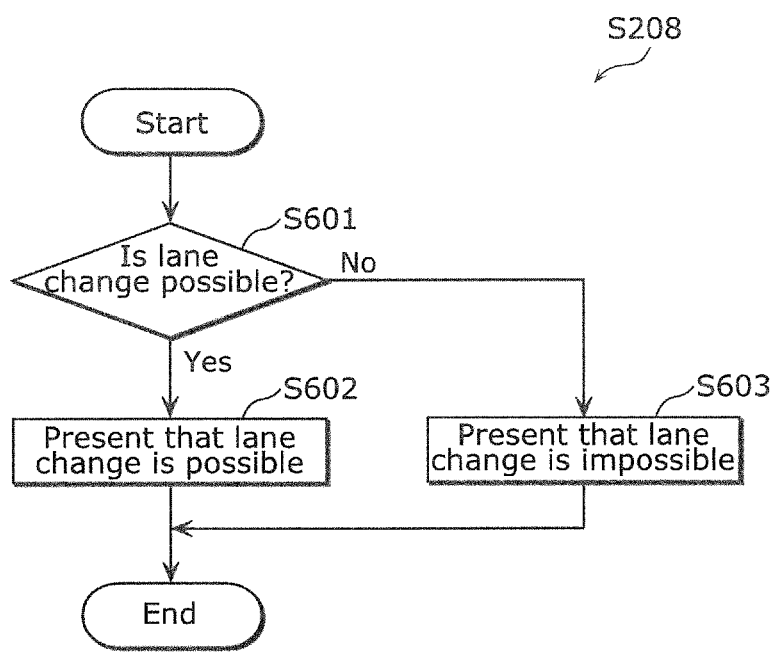
FIG. 8 is a flowchart illustrating details of a situation determination assistance process for lane change in Embodiment 1.

Next, details of the situation determination assistance process for lane change at step S208 in FIG. 4 will be specifically described with reference to FIG. 8. FIG. 8 is a flowchart illustrating details of the situation determination assistance process for lane change in Embodiment 1.

The situation determining unit 102 determines whether the vehicle 10 can change the lane or not (S601). If it is determined that lane change is possible (S601: Yes), the presentation unit 103 presents to the driver that lane change is possible (S602) and ends the process. If it is determined that lane change is impossible (S601: No), the presentation unit 103 presents to the driver that lane change is impossible (S603) and ends the process.

[Determination as to Whether or Not a Lane Change is Possible]

Figure 9:
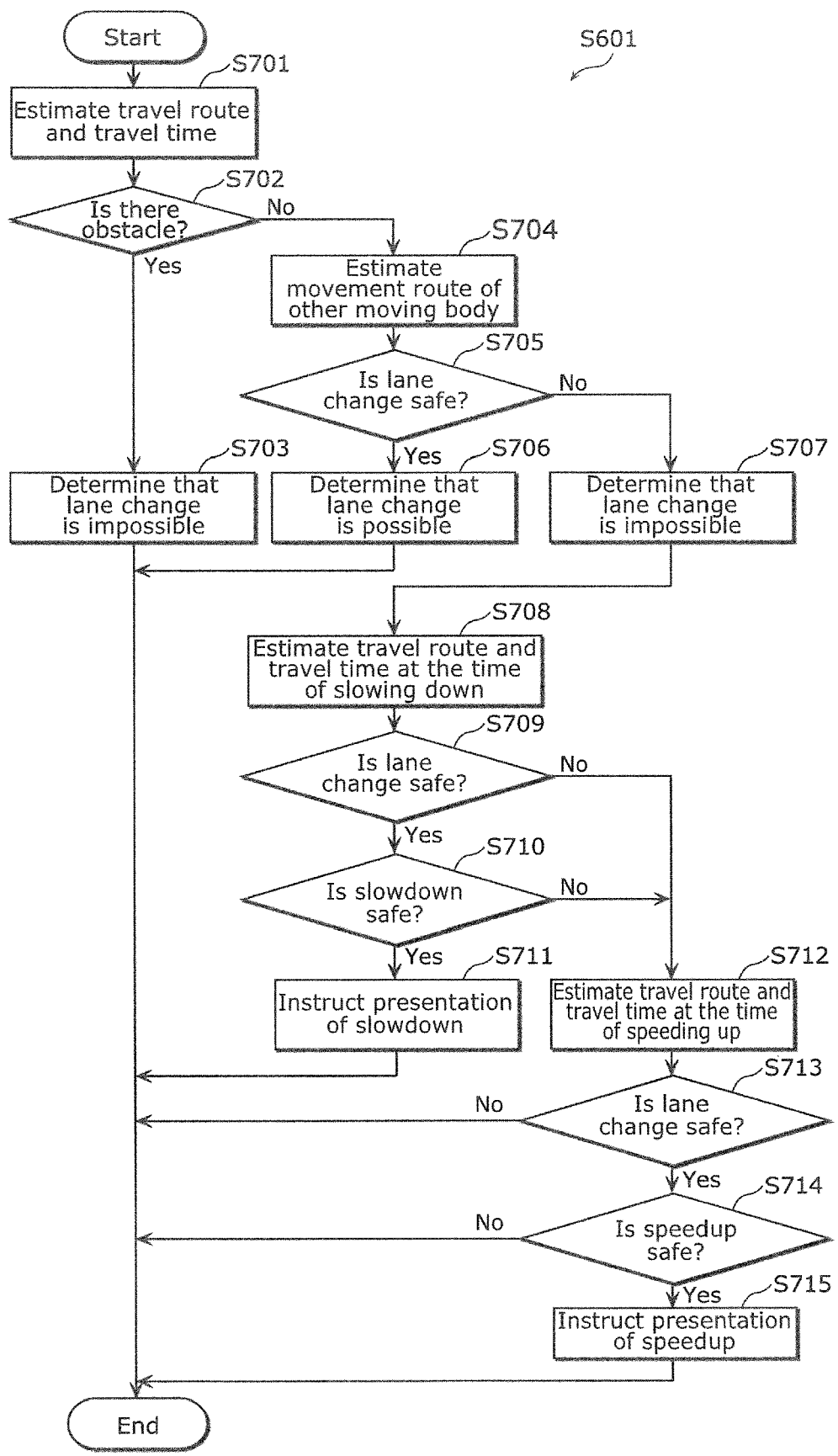
FIG. 9 is a flowchart illustrating details of determination as to whether or not a lane-change is possible in Embodiment 1.

Here, details of the determination as to whether or not a lane change is possible at step S601 in FIG. 8 will be specifically described with reference to FIG. 9. FIG. 9 is a flowchart illustrating details of the determination as to whether or not a lane change is possible in Embodiment 1.

The situation determining unit 102 estimates a travel route and travel time of the vehicle 10 at the time of changing the lane (S701). The situation determining unit 102 determines whether or not there is an obstacle on the estimated travel route (S702). If there is an obstacle (S702: Yes), the situation determining unit 102 determines that lane change is impossible (S703) and ends the process.

If there is not an obstacle (S702: No), the situation determining unit 102 estimates movement routes and movement times of other moving bodies (S704). The situation determining unit 102 determines whether lane change of the vehicle 10 is safe or not based on the estimated travel route and travel time of its own vehicle (the vehicle 10) and the estimated movement routes and movement times of the other moving bodies (S705). For example, in a case of the vehicle 10 entering the second lane from the first lane, the situation determining unit 102 evaluates safety of lane change based on distances between the vehicle 10 and vehicles in front of and behind the vehicle 10 in the second lane.

Here, if it is determined that lane change is safe (S705: Yes), the situation determining unit 102 determines that lane change is possible (S706) and ends the process. On the other hand, if it is determined that lane change is not safe (S705: No), the situation determining unit 102 determines that lane change is impossible (S707). Then, the situation determining unit 102 estimates a travel route and travel time at the time when the vehicle 10 is slowed down (S708).

The situation determining unit 102 determines whether lane change of the slowed-down vehicle 10 is safe or not based on the estimated travel route and travel time of the slowed-down vehicle 10 and the estimated movement routes and movement times of the other moving bodies (S709). If it is determined that lane change of the slowed-down vehicle 10 is safe (S709: Yes), it is determined whether slowdown of the vehicle 10 is safe or not (S710). For example, in the case of the vehicle 10 entering the second lane from the first lane, the situation determining unit 102 evaluates safety of slowdown of the vehicle 10 based on a distance between the vehicle 10 and the vehicle behind the vehicle 10 in the first lane. If it is determined that slowdown of the vehicle 10 is safe (S710: Yes), the situation determining unit 102 instructs the presentation unit 103 to present slowdown (S711) and ends the process. Thereby, the presentation unit 103 presents slowdown to the driver if it is determined that the vehicle 10 can enter the second lane when the vehicle 10 is slowed down.

If it is determined that lane change of the slowed-down vehicle 10 is not safe (S709: No) or it is determined that slowdown of the vehicle 10 is not safe (S710: No), the situation determining unit 102 estimates a travel route and travel time at the time when the vehicle 10 is speeded up (S712).

The situation determining unit 102 determines whether lane change of the speeded-up vehicle 10 is safe or not based on the estimated travel route and travel time of the speeded-up vehicle 10 and the estimated movement routes and movement times of the other moving bodies (S713). If it is determined that lane change of the speeded-up vehicle 10 is safe (S713: Yes), it is determined whether speedup of the vehicle 10 is safe or not (S714). For example, in the case of the vehicle 10 entering the second lane from the first lane, the situation determining unit 102 evaluates safety of speedup based on a distance between the vehicle 10 and the vehicle in front of the vehicle 10 in the first lane. If it is determined that speedup of the vehicle 10 is safe (S714: Yes), the situation determining unit 102 instructs the presentation unit 103 to present speedup (S715) and ends the process. Thereby, the presentation unit 103 presents speedup to the driver if it is determined that the vehicle 10 can enter the second lane when the vehicle 10 is speeded up.

If it is determined that lane change of the speeded-up vehicle 10 is not safe (S713: No) or it is determined that slowdown of the vehicle 10 is not safe (S714: No), the process is immediately ended.

[Information Presentation Screen]

Figure 10A:
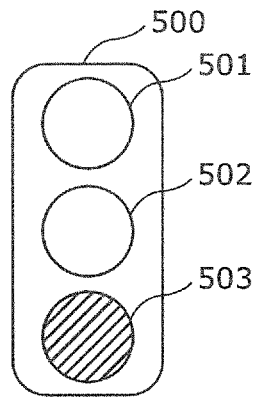
FIG. 10A is a diagram illustrating an example of a screen showing a result of determination as to whether or not entry of a vehicle is possible in Embodiment 1.
Figure 10B:
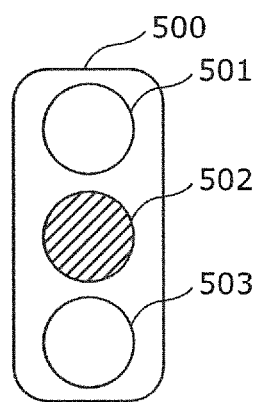
FIG. 10B is a diagram illustrating the example of the screen showing a result of determination as to whether or not entry of a vehicle is possible in Embodiment 1.
Figure 10C:
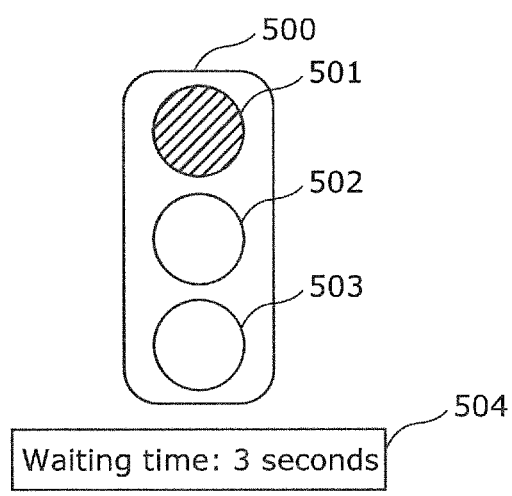
FIG. 10C is a diagram illustrating the example of the screen showing a result of determination as to whether or not entry of a vehicle is possible in Embodiment 1.

Next, an example of a screen for presenting information will be specifically described with reference to FIGS. 10A to 12D. FIGS. 10A to 10C are diagrams illustrating an example of a screen showing a result of determination as to whether or not entry of the vehicle 10 is possible in Embodiment 1. Specifically, in FIGS. 10A to 10C, the determination result is indicated by a traffic light 500. Here, hatching indicates that light is on, and non-hatching indicates that light is off.

As shown in FIGS. 10A to 10C, the traffic light 500 includes a red light 501 indicating that entry is impossible, a yellow light 502 indicating that, though entry is possible, time until entry becomes impossible is short and a green light 503 indicating that entry is possible.

Since the green light 503 is on in FIG. 10A, it is shown that it has been determined by the information presentation device 100 that entry is possible.

Since the yellow light 502 is on in FIG. 10B, it is shown that, though it has been determined by the information presentation device 100 that entry is possible, the state soon changes to a state that entry is impossible.

Since the red light 501 is on in FIG. 10C, it is shown that it has been determined by the information presentation device 100 that entry is impossible. Furthermore, a countdown 504 for time until the state that entry is impossible changes to a state that entry is possible.

For example, if it is determined that left turn is impossible at step S402 of the flowchart of FIG. 6, FIG. 10C is displayed on the display in the vehicle 10. Further, for example, if it is determined that left turn is possible at step S406 of the flowchart of FIG. 6, FIG. 10A is displayed on the display in the vehicle 10.

Figure 11A:
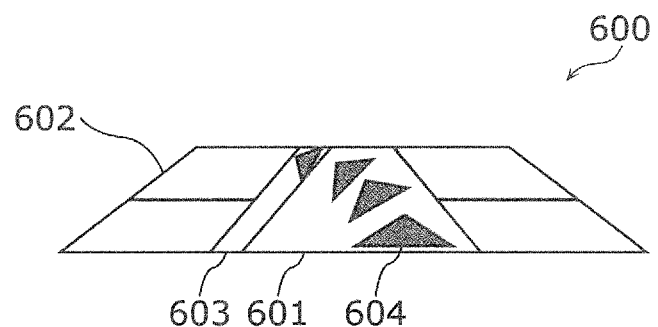
FIG. 11A is a diagram illustrating another example of the screen showing a result of determination as to whether or not entry of a vehicle is possible in Embodiment 1.
Figure 11B:
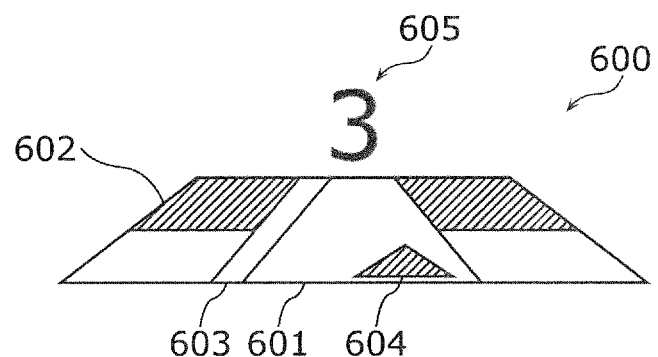
FIG. 11B is a diagram illustrating another example of the screen showing a result of determination as to whether or not entry of a vehicle is possible in Embodiment 1.
Figure 11C:
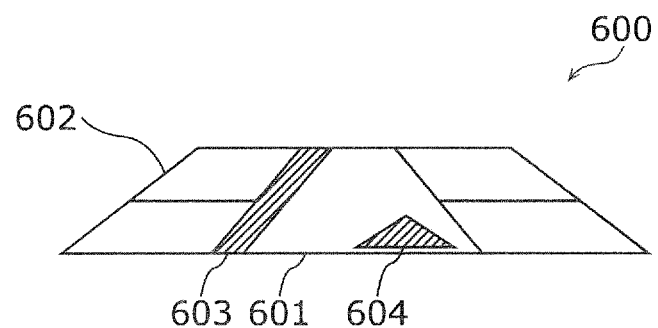
FIG. 11C is a diagram illustrating another example of the screen showing a result of determination as to whether or not entry of a vehicle is possible in Embodiment 1.

FIGS. 11A to 11C are diagrams illustrating another example of the screen showing a result of the determination as to whether or not entry of the vehicle 10 is possible in Embodiment 1. Specifically, FIGS. 11A to 11C illustrate a screen 600 showing whether or not a left turn is possible at an intersection. The screen 600 includes a first lane 601 on which the vehicle 10 is traveling, a second lane 602 which crosses the first lane 601, a footpath 603 which extends in parallel with the first lane 601 and a mark (marks) 604 indicating the vehicle 10.

Here, hatching indicates a red color and indicates that entry is impossible or is dangerous (unsafe). On the other hand, non-hatching indicates a green color and indicates that entry is possible or being safe. The colors indicating that entry is impossible and that entry is possible are examples, and other colors may be adopted.

FIG. 11A illustrates the screen 600 displayed when it is determined that left turn is possible. On the screen 600 in FIG. 11A, the marks 604 indicating an entry route are displayed being overlapped on images of the first lane 601 and the second lane 602.

FIG. 11B illustrates the screen 600 displayed when it is determined that left turn is impossible. On the screen 600 in FIG. 11B, the mark 604 is hatched. Furthermore, the second lane 602 is also hatched. Therefore, it is seen that it is determined that entry is impossible because of an object on the second lane 602. Further, a countdown 605 showing time until the state that entry is impossible changes to a state that entry is possible is displayed, and it is seen that the determination changes to the determination that entry is possible after three seconds.

FIG. 11C illustrates the screen 600 displayed when it is determined that left turn is impossible. On the screen 600 in FIG. 11C, the mark 604 is hatched. Furthermore, the footpath 603 is also hatched. Therefore, it is seen that it is determined that entry is impossible because of an object (for example, a pedestrian) on the footpath 603.

FIGS. 12A to 12D are diagrams illustrating another example of the screen showing a result of the determination as to whether or not entry of the vehicle 10 is possible in Embodiment 1. Specifically, FIGS. 12A to 12D illustrate a screen 700 showing whether or not a lane change from a first lane 701 to a second lane 702 is possible. The screen 700 includes the first lane 701 on which the vehicle 10 is traveling, the second lane 702 adjacent to the first lane 701 in parallel and a mark (marks) 703 indicating the vehicle 10.

Here, hatching indicates a red color and indicates that entry is impossible or is dangerous (unsafe). On the other hand, non-hatching indicates a green color and indicates that entry is possible or being safe. The colors indicating that entry is impossible and that entry is possible are examples, and other colors may be adopted.

Figure 12A:
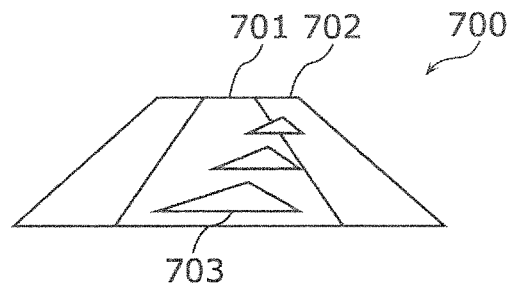
FIG. 12A is a diagram illustrating another example of the screen showing a result of determination as to whether or not entry of a vehicle is possible in Embodiment 1.

FIG. 12A illustrates the screen 700 displayed when it is determined that lane change is possible. On the screen 700 in FIG. 12A, the marks 703 indicating an entry route are displayed being overlapped on images of the first lane 701 and the second lane 702.

Figure 12B:
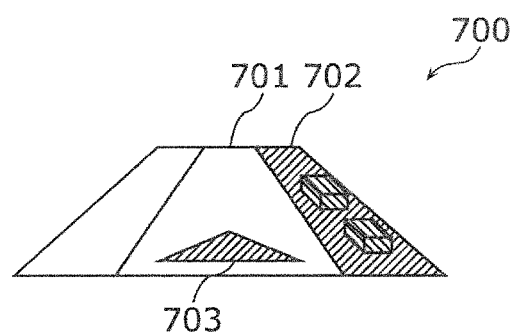
FIG. 12B is a diagram illustrating another example of the screen showing a result of determination as to whether or not entry of a vehicle is possible in Embodiment 1.

FIG. 12B illustrates the screen 700 displayed when it is determined that lane change is impossible. On the screen 700 in FIG. 12B, the mark 703 is hatched. Furthermore, the second lane 702 is also hatched. Therefore, it is seen that it is determined that lane change is impossible, and lane change to the second lane 702 is dangerous (unsafe).

Figure 12C:
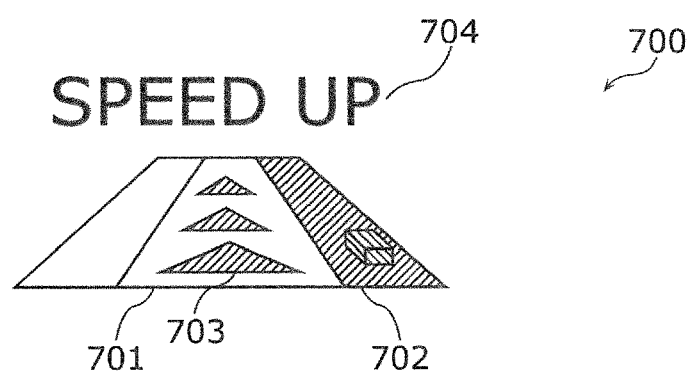
FIG. 12C is a diagram illustrating another example of the screen showing a result of a determination as to whether or not entry of a vehicle is possible in Embodiment 1.

FIG. 12C illustrates the screen 700 displayed when it is determined that lane change is impossible, and speedup is recommended. On the screen 700 in FIG. 12C, the second lane 702 and the marks 703 are hatched. Therefore, it is seen that it is determined that lane change is impossible, and lane change to the second lane 702 is dangerous (unsafe). However, the marks 703 are arranged in line forward in the first lane 701, and, furthermore, a message 704 of "SPEED UP" is displayed. Therefore, it is seen that speedup of the vehicle 10 is recommended for lane change. This screen 700 is displayed, for example, when presentation of speedup is specified at step S715 in FIG. 9.

Figure 12D:
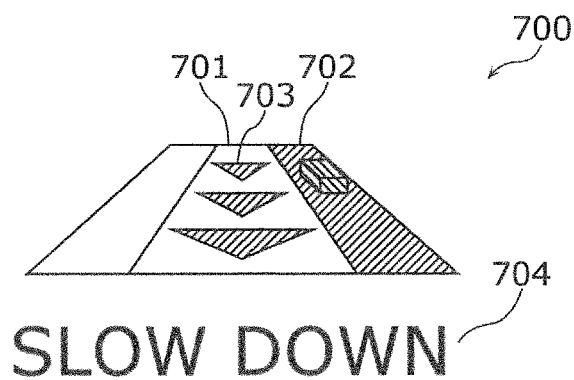
FIG. 12D is a diagram illustrating another example of the screen showing a result of determination as to whether or not entry of a vehicle is possible in Embodiment 1.

FIG. 12D illustrates the screen 700 displayed when it is determined that lane change is impossible, and slowdown is recommended. On the screen 700 in FIG. 12D, the second lane 702 and the marks 703 are hatched. Therefore, it is seen that it is determined that lane change is impossible, and lane change to the second lane 702 is dangerous (unsafe). However, the marks 703 are arranged in line backward in the first lane 701, and, furthermore, a message 704 of "SLOW DOWN" is displayed. Therefore, it is seen that slowdown of the vehicle 10 is recommended for lane change. This screen 700 is displayed, for example, when presentation of slowdown is specified at step S711 in FIG. 9.

[Advantageous Effects]

As described above, according to the information presentation device 100 according to this embodiment, it is possible to determine whether or not the vehicle 10 can enter the second lane different from the first lane on which the vehicle 10 is traveling, based on information about objects located in the periphery of the vehicle 10 and present a result of the determination to the driver. Therefore, it is possible to present information appropriate for the driver's situation as information for assisting the driver's situation determination. Especially, since it is possible to, when it is determined that entry into the second lane is possible, present the determination result to the driver, it is possible to not only assist avoidance of danger but also assist smooth entry of the vehicle 10 into the second lane.

Further, according to the information presentation device 100 according to this embodiment, it is possible to determine whether or not the vehicle can enter the second lane when the vehicle is speeded up or slowed down and present speedup or slowdown to the driver according to a result of the determination. Therefore, the driver can smoothly enter the second lane by driving the vehicle 10 in accordance with the presentation of the speedup or slowdown instruction. That is, the information presentation device 100 can assist smooth entry of the vehicle 10 into the second lane.

Further, according to the information presentation device 100 according to this embodiment, it is possible to present a determination result by displaying an image of a traffic light. Further, it is also possible to present a determination result by displaying a mark indicating an entry route, overlapping the mark on images of the first and second lanes. Furthermore, it is also possible to present a determination result by displaying the image of the second lane in a color corresponding to the determination result. Thereby, it is possible to visually present a determination result to the driver in an easy-to-understand manner and effectively assist a situation determination by the driver.

Further, according to the information presentation device 100 according to this embodiment, it is possible to present a countdown for time until one of a state that entry is possible and a state that entry is impossible changes to the other. Therefore, when one of the state that entry is possible and the state that entry is impossible changes to the other, the driver can immediately make a situation determination appropriate for a state after the change. That is, it is possible to effectively assist situation determination by the driver.

Embodiment 2

Next, Embodiment 2 will be specifically described with reference to FIGS. 13 and 14. Embodiment 2 is different from Embodiment 1 in that information is presented in a presentation method corresponding to an attribute set of a driver. Embodiment 2 will be described below mainly on the point different from Embodiment 1.
[Functional Configuration of Information Presentation Device]
FIG. 13 is a block diagram illustrating a functional configuration of an information presentation device 200 according to Embodiment 2. In FIG. 13, components which are the same as or similar to those in FIG. 2 are given the same reference numerals, and description of the components will be omitted as appropriate.

The information presentation device 200 is provided with the information acquiring unit 101, the situation determining unit 102, a driver's attribute acquiring unit 201, a presentation method determining unit 202, and a presentation unit 203.

The driver's attribute acquiring unit 201 acquires an attribute set which includes at least one attribute of the driver. The attribute set includes, for example, the driver's sex, age, and length of driving experience (for example, the number of years of driving). For example, the driver's attribute acquiring unit 201 may receive input of the attributes from the driver via a user interface. Further, for example, the driver's attribute acquiring unit 201 may photograph an image of the driver and recognize the attributes of the driver from the image.

The presentation method determining unit 202 refers to information showing correspondence relationships between a plurality of attribute sets and a plurality of presentation methods to determine a presentation method corresponding to the attribute set of the driver acquired by the driver's attribute acquiring unit 201. This information is stored in, for example, a storage unit (not shown) provided in the information presentation device 200 or a storage device (not shown) connected via a communication network.

The presentation unit 203 presents a result of the determination as to whether or not entry of the vehicle 10 is possible, based on a presentation method corresponding to the attribute set of the driver.
[Information Showing Correspondence Relationships Between a Plurality of Attribute Sets and a Plurality of Presentation Methods]
Next, an example of the information showing correspondence relationships between a plurality of attribute sets and a plurality of presentation methods will be specifically described with reference to FIG. 14. FIG. 14 is a diagram illustrating an example of the information showing correspondence relationships between a plurality of attribute sets and a plurality of presentation methods in Embodiment 2.

In FIG. 14, each attribute set includes age and sex. Each presentation method includes items of whether or not entry is possible, safety, and speed, and whether each item is to be presented/unpresented is indicated by 1/0. For example, if the attribute set of the driver indicates a 25-year-old male, information about whether or not entry is possible and information about speed are not presented, and only information about safety is presented. For example, in FIGS. 12A to 12D, hatching of the second lane 702 is presented to the driver who is a 25-year-old male, and the mark 703 or the message 704 is not presented.

The information showing such correspondence relationships may be generated, for example, by acquiring, from each of a plurality of drivers, attribute sets of the drivers and presentation method comfortable for the drivers in advance. Further, for example, from each of the plurality of drivers, the attribute set of the driver and the driver's driving characteristics at the time when information is presented are acquired, and the information showing the correspondence relationships may be generated based on the driving characteristics. Specifically, for example, if a driver ignores the presented information and drives, information showing a correspondence relationship may be generated for the attribute set of the driver so that the ignored information is not presented.
[Advantageous Effects]
As described above, according to the information presentation device 200 according to this embodiment, it is possible to present a determination result in a presentation method corresponding to an attribute set of a driver. Therefore, it is possible to present a determination result in a presentation method appropriate for a driver's taste or driving tendency.

Further, according to the information presentation device 200 according to this embodiment, it is possible to refer to information showing correspondence relationships between a plurality of attribute sets and a plurality of presentation methods to determine a presentation method corresponding to an attribute set of a driver. Therefore, it is possible to easily determine a presentation method appropriate for a driver's taste or driving tendency from an attribute set of the driver.

Further, according to the information presentation device 200 according to this embodiment, it is possible to include a driver's age, sex, and length of driving experience in an attribute set.

Embodiment 3

Figure 16:
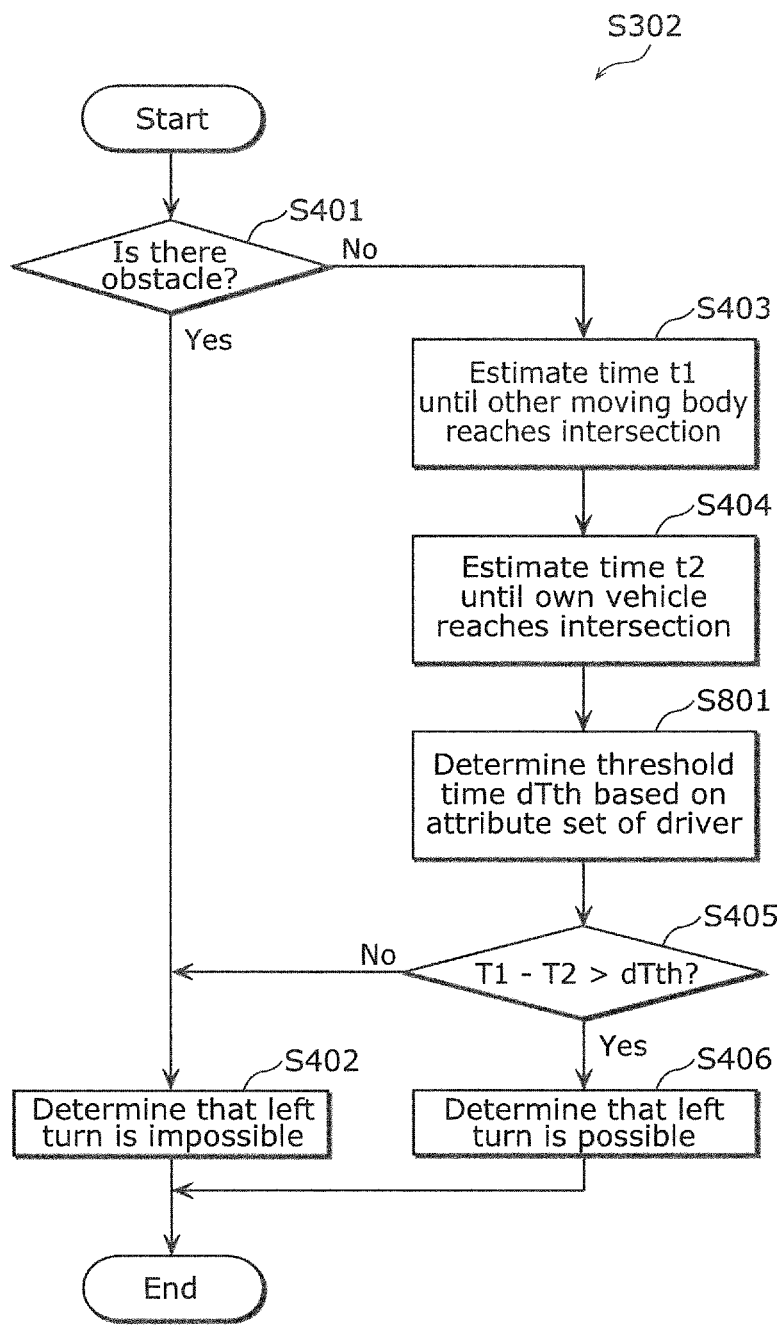
FIG. 16 is a flowchart illustrating details of determination as to whether or not a left-turn is possible in Embodiment 3.

Next, Embodiment 3 will be specifically described with reference to FIGS. 15 and 16. Embodiment 3 is different from Embodiments 1 and 2 in that whether or not entry of a vehicle is possible is determined based on an attribute set of a driver. Embodiment 3 will be described below mainly on the point different from Embodiments 1 and 2.
[Functional Configuration of Information Presentation Device]
FIG. 15 is a block diagram illustrating a functional configuration of an information presentation device 300 according to Embodiment 3. In FIG. 15, components which are the same as or similar to those in FIGS. 2 and 13 are given the same reference numerals, and description of the components will be omitted as appropriate.

The information presentation device 300 is provided with the information acquiring unit 101, the presentation unit 103, the driver's attribute acquiring unit 201, a threshold time determining unit 301, and a situation determining unit 302.

The threshold time determining unit 301 determines threshold time based on the attribute set of the driver. For example, the threshold time determining unit 301 refers to information showing correspondence relationships between a plurality of attribute sets and a plurality of threshold times to determine threshold time corresponding to the attribute set of the driver. Further, for example, the threshold time determining unit 301 may determine an addition value to threshold time based on the attribute set of the driver and determine threshold time corresponding to the attribute set of the driver by adding the addition value to threshold time determined in advance.

The situation determining unit 302 determines whether or not entry of the vehicle 10 is possible based on information about objects located in the periphery of the vehicle 10 acquired by the information acquiring unit 101, and the attribute set of the driver acquired by the driver's attribute acquiring unit 201. In this embodiment, the situation determining unit 302 determines whether or not entry of the vehicle 10 is possible using the threshold time determined by the threshold time determining unit 301.

[Determination as to Whether or Not a Left Turn is Possible]

Here, details of the determination as to whether or not a left turn is possible at step S302 in FIG. 5 in Embodiment 3 will be specifically described with reference to FIG. 16. FIG. 16 is a flowchart illustrating details of the determination as to whether or not a left turn is possible in Embodiment 3. In FIG. 16, steps which are the same as or similar to those in FIG. 6 are given the same reference numerals, and description of the steps will be omitted as appropriate.

After the time T2 until its own vehicle (the vehicle 10) reaches the intersection is estimated (S404), the threshold time determining unit 301 determines the threshold time dTth based on an attribute set of the driver (S801). After that, by comparing time from when the vehicle 10 reaches a position on the second lane to when another vehicle reaches the position on the second lane (T1-T2) and the determined threshold time dTth, whether or not a left turn (entry) of the vehicle 10 is possible is determined (S405, S406, and S402).

[Advantageous Effects]

As described above, according to the information presentation device 300 according to this embodiment, it is possible to determine whether or not a vehicle can enter the second lane based on an attribute set of a driver. Therefore, it is possible to make a determination appropriate for the driver.

Further according to the information presentation device 300 according to this embodiment, it is possible to, by comparing time from when a vehicle reaches a position on the second lane to when another vehicle reaches the position on the second lane and threshold time based on an attribute set of a driver, determine whether or not the vehicle can enter the second lane. Therefore, it is possible to change extra time at the time of entry according to an attribute set of a driver, and it is possible to reduce a risk of collision between vehicles.

Embodiment 4

Next, Embodiment 4 will be specifically described with reference to FIGS. 17A to 21. This embodiment is different in a point that an attribute set of a driver, driving information, and various pieces of setting information are collected from each of a plurality of vehicles; information showing correspondence relationships between a plurality of attribute sets and a plurality of presentation methods or a plurality of threshold times is generated; and the generated information is provided for each vehicle (the information presentation device according to Embodiments 2 and 3 described above) via the Internet or the like.

[Overall Picture of Provided Service]

Figure 17A:
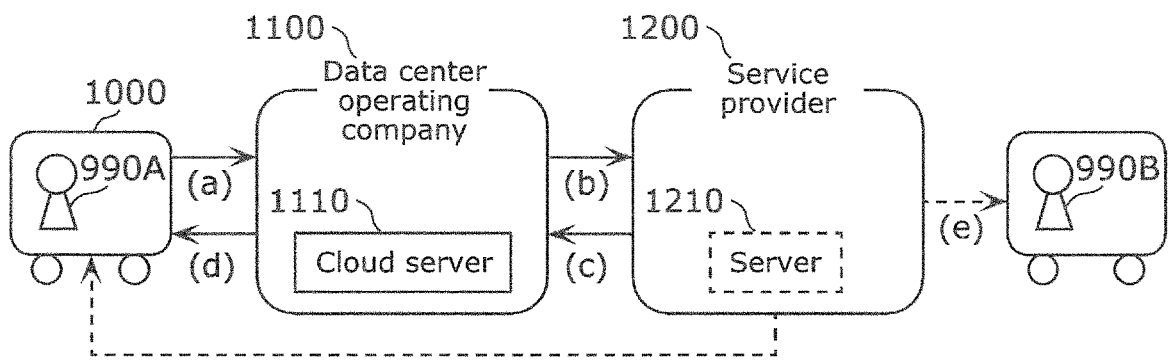
FIG. 17A is a diagram illustrating an overall picture of a service provision system in Embodiment 4.

In FIG. 17A, an overall picture of a service provision system in Embodiment 4 is shown.

A group 1000 is, for example, a company, a party, or a family, and its scale does not matter. A plurality of vehicles (a plurality of information presentation devices) exist in the group 1000. Further, a plurality of drivers 990A who drive the plurality of vehicles, respectively, exist in the group 1000.

Figure 17B:
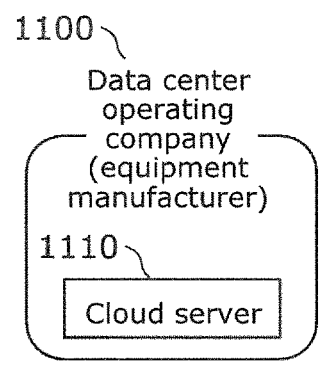
FIG. 17B is a diagram illustrating another example of a data center operating company in Embodiment 4.
Figure 17C:
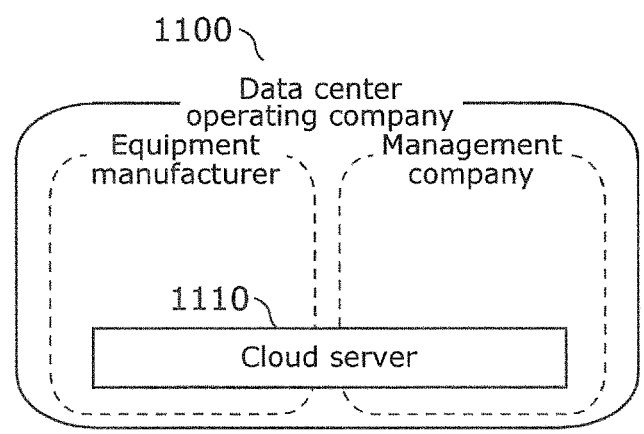
FIG. 17C is a diagram illustrating another example of the data center operating company in Embodiment 4.

A cloud server 1110 exists in a data center operating company 1100. The cloud server 1110 is a virtualized server which cooperates with various pieces of equipment via the Internet. The cloud server 1110 mainly manages huge data (big data) and the like which are difficult to handle by an ordinary database management tool and the like. The data center operating company 1100 performs data management, management of the cloud server 1110, operation of a data center which performs the managements, and the like. Details of services provided by the data center operating company 1100 will be described later. Here, the data center operating company 1100 is not limited to a company which performs only data management, operation of the cloud server 1110, and the like. For example, if an equipment manufacturer which develops and manufactures equipment mounted on the plurality of vehicles also performs data management, management of the cloud server 1110, and the like, the equipment manufacturer corresponds to the data center operating company 1100 (FIG. 17B). Further, the data center operating company 1100 is not limited to one company. For example, the equipment manufacturer and another management company perform data management and operation of the cloud server 1110 in collaboration or by sharing, it is assumed that both or any one of the equipment manufacturer and another management company corresponds to the data center operating company 1100 (FIG. 17C).

A service provider 1200 holds a server 1210. The scale of the server 1210 stated here does not matter, and the server 1210 includes a memory or the like in a personal PC also. Further, there may be a case where the service provider does not hold the server 1210.

Next, a flow of information in the above service will be described.

First, each vehicle of the group 1000 transmits driving information about the vehicle to the cloud server 1110 of the data center operating company 1100. The cloud server 1110 accumulates the plurality of pieces of driving information ((a) in FIG. 17A). Here, the driving information is information showing states of a vehicle and a driver and includes, for example, a position and speed of the vehicle, attributes of the driver, and the like. Furthermore, the driving information may include an output of the sensor 20 and operation information about a steering wheel, an accelerator, a brake, and a direction indicator. The driving information may be directly provided for the cloud server 1110 from the plurality of vehicles via the Internet.

Next, the cloud server 1110 of the data center operating company 1100 provides the accumulated driving information for the service provider 1200 in predetermined units. Here, the units may be units in which the data center operating company can arrange and provide the accumulated information to the service provider 1200 or units requested by the service provider 1200. Though it was described that the accumulated driving information is provided in predetermined units, the units may not be predetermined units. Amount of provided information may change according to a situation. The driving information is stored into the server 1210 held by the service provider 1200 as necessary ((b) in FIG. 17A). Then, the service provider 1200 generates information about correspondence relationships between a plurality of attribute sets and a plurality of presentation methods or a plurality of threshold times from the driving information and provides the correspondence relationship information to vehicles (information presentation devices). The vehicles provided with the correspondence relationship information may be the vehicles driven by the drivers 990A or may be vehicles driven by other drivers 990B. As for a method for providing services to the drivers, for example, the services may be provided for the drivers directly from the service provider ((e) in FIG. 17A). Further, as for the method for providing the services to the drivers, for example, the services may be provided for the drivers via the cloud server 1110 of the data center operating company 1100 again ((c) and (d) in FIG. 17A). Further, the cloud server 1110 of the data center operating company 1100 may arrange the driving information into information suitable for the services to be provided for the drivers and provide the information for the service provider 1200.

The drivers 990A and the drivers 990B may be different or the same. The drivers 990A and the drivers 990B are also referred to as users.

The technique described in the above aspect can be realized, for example, in the following cloud service types. However, types in which the technique described in the above aspect is realized are not limited to the types.

[Service Type 1: Company's Own Data Center Type]

Figure 18:
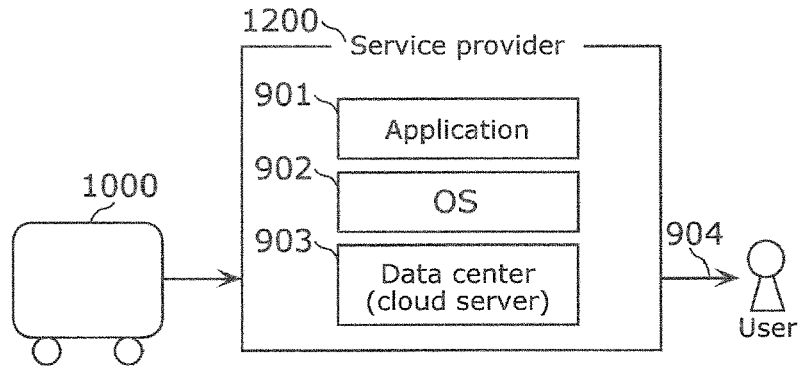
FIG. 18 is a diagram illustrating a service type 1 (a company's own data center type) in Embodiment 4.

FIG. 18 illustrates a service type 1 (a company's own data center type). The present type is a type in which the service provider 1200 acquires information from the group 1000 and provides a service for the users. In the present type, the service provider 1200 has a function of the data center operating company. That is, the service provider holds the cloud server 1110 which manages big data. Therefore, the data center operating company does not exist.

In the present type, the service provider 1200 operates and manages a data center 903 (the cloud server 1110). Further, the service provider 1200 manages an OS 902 and an application 901. The service provider 1200 provides a service 904 with the OS 902 and the application 901 that the service provider 1200 manages.

[Service Type 2: IaaS Use Type]

Figure 19:
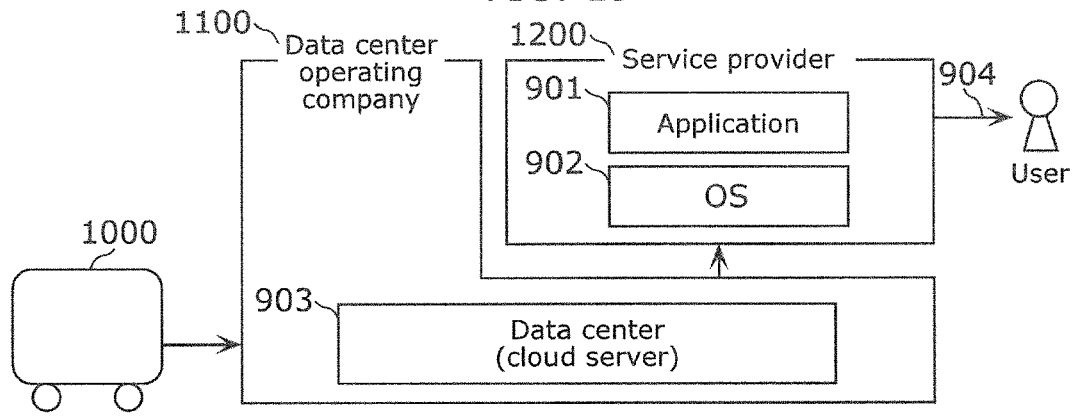
FIG. 19 is a diagram illustrating a service type 2 (an IaaS use type) in Embodiment 4.

FIG. 19 illustrates a service type 2 (an IaaS use type). Here, IaaS is an abbreviation of Infrastructure as a Service, and it is a cloud service provision model for providing an infrastructure itself for causing a computer system to be constructed and operated as a service via the Internet.

In the present type, the data center operating company 1100 operates and manages the data center 903 (the cloud server 1110). Further, the service provider 1200 manages the OS 902 and the application 901. The service provider 1200 provides the service 904 with the OS 902 and the application 901 that the service provider 1200 manages.

[Service Type 3: PaaS Use Type]

Figure 20:
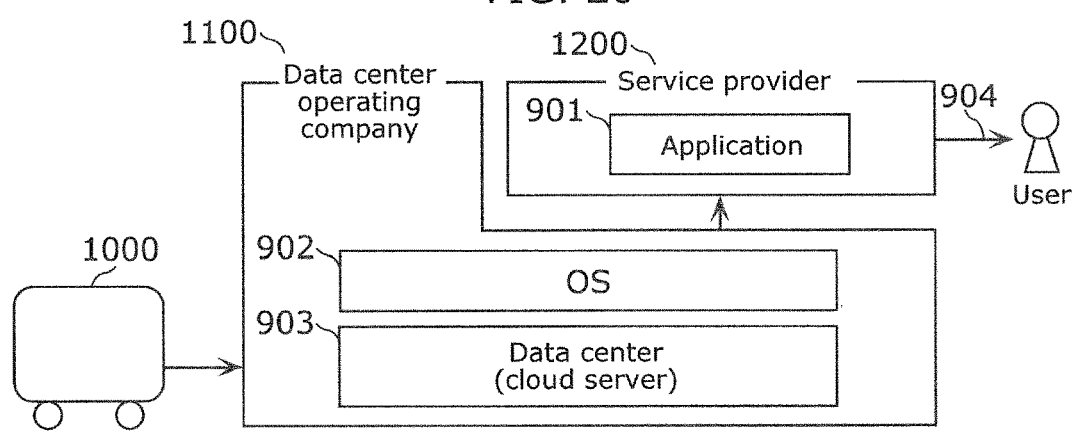
FIG. 20 is a diagram illustrating a service type 3 (a PaaS use type) in Embodiment 4.

FIG. 20 illustrates a service type 3 (a PaaS use type). Here, PaaS is an abbreviation of Platform as a Service, and it is a cloud service provision model for providing a platform to be a foundation for causing software to be constructed and operated as a service via the Internet.

In the present type, the data center operating company 1100 manages the OS 902, and operates and manages the data center 903 (the cloud server 1110). Further, the service provider 1200 manages the application 901. The service provider 1200 provides the service 904 with the OS 902 managed by the data center operating company and the application 901 managed by the service provider 1200.

[Service Type 4: SaaS Use Type]

Figure 21:
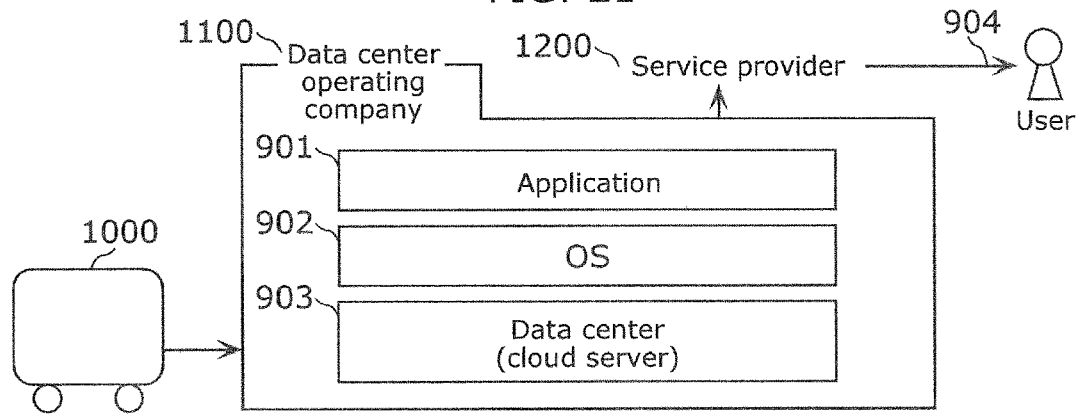
FIG. 21 is a diagram illustrating a service type 4 (a SaaS use type) in Embodiment 4.

FIG. 21 illustrates a service type 4 (a SaaS use type). Here, SaaS is an abbreviation of Software as a Service. This is, for example, a cloud service provision model having a function making it possible for a company/individual (a user) that does not have a data center (a cloud server) to use an application provided by a platform provider that holds a data center (a cloud server) via a network such as the Internet.

In the present type, the data center operating company 1100 manages the application 901, manages the OS 902, and operates and manages the data center 903 (the cloud server 1110). Further, the service provider 1200 provides the service 904 with the OS 902 and the application 901 managed by the data center operating company 1100.

In any of the above types, it is assumed that the service provider 1200 performs an act of providing a service. Further, for example, the service provider or the data center operating company itself may develop an OS, an application, a big data database, or the like or may outsource the development to a third party.

Other Embodiments

An information presentation device according to one or more aspects of the present disclosure has been described above based on embodiments. The present disclosure, however, is not limited to the embodiments. Various variations of these embodiments which can be conceived by those skilled in the art and an embodiment constructed by combining components in different embodiments may be included within a scope of the one or more aspects of the present disclosure as far as the embodiments do not depart from the spirit of the present disclosure.

For example, though a screen for presenting a countdown for time until a state that entry is impossible changes to a state that entry is possible (FIG. 10C) is described in Embodiment 1 described above, a countdown for time until the state that entry is possible changes to the state that entry is impossible may be further presented. In this case, for example, in each of the screens of FIGS. 10A and 10B, it is only necessary to count down time until the screen changes to the screen of FIG. 10C.

The presentation method corresponding to an attribute set in Embodiment 2 is an example, and a presentation method is not limited thereto. For example, attributes included in an attribute set are not limited to sex and age. Further, not only switching between presentation and unpresentation of items but also switching between colors or sizes of the items may be performed based on presentation methods.

The method for determination as to whether or not entry is possible in each embodiment described above is an example, and a determination method is not limited thereto. For example, machine learning (for example, deep learning) may be used for the determination as to whether or not entry is possible. Any method is possible as long as the determination as to whether or not entry is possible can be made.

The method for presenting a determination result in each embodiment described above is an example, and a method is not limited thereto. For example, information may be presented using a blink or the like instead of colors.

Further, a part or all of the components that the information presentation device in each embodiment described above is provided with may be configured with one system LSI (Large Scale Integration). For example, the information presentation device 100 may be configured with a system LSI having the information acquiring unit 101, the situation determining unit 102, and the presentation unit 103.

The system LSI is a super-multi-function LSI manufactured by integrating a plurality of component units on one chip, and is, specifically, a computer system configured including a microprocessor, a ROM (Read Only Memory), a RAM (Random Access Memory), and the like. A computer program is stored in the ROM. By the microprocessor operating according to the computer program, the system LSI achieves its function.

Though a system LSI is assumed here, the system may be called an IC, an LSI, a super LSI, or an ultra LSI according to difference in a degree of integration. Further, a method for integrated circuitization is not limited to LSI, and an integrated circuit may be realized by a dedicated circuit or a general-purpose processor. An FPGA (Field Programmable Gate Array) which can be programmed after manufacture of an LSI or a reconfigurable processor in which connections and settings of circuit cells inside an LSI can be reconfigured may be used.

Furthermore, if an integrated circuitization technology which replaces LSI appears due to progress in semiconductor technology or by other derivative techniques appears, integration of functional blocks may be, of course, performed with the technique. Application of biotechnology can be a possibility.

Further, one aspect of the present disclosure is not only such an information presentation device but may be an information presentation method having characteristic component units included in the information presentation device as steps. Further, one aspect of the present disclosure may be a computer program causing a computer to execute each characteristic step included in the information presentation method. Further, one aspect of the present disclosure may be a non-transitory computer-readable recording medium in which such a computer program is recorded.

In each embodiment described above, each component may be configured with dedicated hardware or realized by executing a software program appropriate for the component. Each component may be realized by a program executing unit such as a CPU or a processor reading and executing the software program recorded in a recording medium such as a hard disk or a semiconductor memory. Here, the software realizing the information presentation device and the like in each embodiment is a program as below.

That is, this program causes a computer to execute an information presentation method for presenting information for assisting situation determination by a driver of a vehicle, the method comprising: acquiring information about objects located in the periphery of the vehicle; determining whether or not the vehicle can enter a second lane different from a first lane on which the vehicle is traveling, based on the information about the objects; and presenting a result of the determination to the driver.

The herein disclosed subject matter is to be considered descriptive and illustrative only, and the appended Claims are of a scope intended to cover and encompass not only the particular embodiments disclosed, but also equivalent structures, methods, and/or uses.

INDUSTRIAL APPLICABILITY

An information presentation device according to one or more exemplary embodiments disclosed herein can be used as an information presentation device for presenting information for assisting situation determination by a driver of a vehicle, to the driver.

The invention claimed is:

1. An information presentation method for presenting information for assisting situation determination by a driver of a vehicle, the method comprising:
   acquiring information about an object located in a periphery of the vehicle;
   determining whether or not the vehicle can enter a second lane different from a first lane on which the vehicle is traveling, based on the information about the object; and
   presenting a result of the determination to the driver,
   wherein the presenting further includes displaying an image of the second lane in a color corresponding to the result of the determination.

2. The information presentation method according to claim 1,
   wherein the determining further includes determining whether or not the vehicle can enter the second lane when the vehicle speeds up or slows down; and
   the presenting further includes (i) presenting speedup to the driver if it is determined that the vehicle can enter the second lane when the vehicle speeds up and (ii) presenting slowdown to the driver if it is determined that the vehicle can enter the second lane when the vehicle slows down.

3. The information presentation method according to claim 1,
   wherein the presenting further includes presenting the result of the determination, based on a presentation method corresponding to an attribute set that includes at least one attribute of the driver.

4. The information presentation method according to claim 3,
   wherein the presenting further includes referring to information showing correspondence relationships between a plurality of attribute sets and a plurality of presentation methods to determine the presentation method corresponding to the attribute set of the driver.

5. The information presentation method according to claim 1,
   wherein the determining further includes determining whether or not the vehicle can enter the second lane based on the information about the object and an attribute set that includes at least one attribute of the driver.

6. The information presentation method according to claim 5,
   wherein the determining further includes:
   calculating time from when the vehicle reaches a position on the second lane to when another vehicle reaches the position on the second lane, based on the information about the object;
   determining threshold time based on the attribute set of the driver; and
   determining whether or not the vehicle can enter the second lane by comparing the calculated time and the determined threshold time.

7. The information presentation method according to claim 3,
   wherein the attribute set includes age of the driver.

8. The information presentation method according to claim 3,
wherein the attribute set includes sex of the driver.

9. The information presentation method according to claim 3,
wherein the attribute set includes a length of driving experience of the driver.

10. The information presentation method according to claim 1,
wherein the presenting further includes displaying an image of a traffic light indicating the result of the determination.

11. The information presentation method according to claim 1,
wherein the presenting further includes displaying a mark indicating an entry route, overlapping the mark on images of the first lane and the second lane if it is determined that the vehicle can enter into the second lane is possible.

12. The information presentation method according to claim 1,
wherein the presenting further includes presenting a countdown for time until one of a state that entry is possible and a state that entry is impossible changes to another.

13. A non-transitory computer-readable recording medium for use in a computer, the recording medium having a computer program recorded thereon for causing the computer to execute the information presentation method according to claim 1.

14. An information presentation device that presents information for assisting situation determination by a driver of a vehicle, the device comprising:

an information acquiring unit configured to acquire information about an object located in a periphery of the vehicle;

a situation determining unit configured to determine whether or not the vehicle can enter a second lane different from a first lane on which the vehicle is traveling, based on the information about the object; and a presentation unit configured to present a result of the determination to the driver, wherein the presentation unit is further configured to display an image of the second lane in a color corresponding to the result of the determination.

* * * * *